(12) United States Patent
Dezonno

(10) Patent No.: US 6,810,077 B1
(45) Date of Patent: Oct. 26, 2004

(54) SYSTEM AND METHOD FOR PROVIDING INFORMATIVE COMMUNICATION

(75) Inventor: Anthony J. Dezonno, Bloomingdale, IL (US)

(73) Assignee: Rockwell Electronic Commerce Technologies, LLC, Wood Dale, IL (US)

(*) Notice: Subject to any disclaimer, the term of this patent is extended or adjusted under 35 U.S.C. 154(b) by 655 days.

(21) Appl. No.: 09/664,620

(22) Filed: Sep. 19, 2000

(51) Int. Cl.[7] .............................................. H04B 1/38
(52) U.S. Cl. .................................................... 375/222
(58) Field of Search ................................ 375/222, 219, 375/220; 370/276, 277, 278, 279, 282, 293, 354; 455/403, 439, 455, 462, 558, 555, 550, 557

(56) References Cited

U.S. PATENT DOCUMENTS

| | | | | |
|---|---|---|---|---|
| 4,649,567 A | * | 3/1987 | Childress | 455/17 |
| 5,956,410 A | * | 9/1999 | Brisson | 381/94.1 |
| 5,991,384 A | * | 11/1999 | Wulkan | 379/114.15 |
| 6,021,119 A | * | 2/2000 | Derks et al. | 370/261 |
| 6,085,097 A | * | 7/2000 | Savery et al. | 455/456.1 |
| 6,148,072 A | * | 11/2000 | Huang | 379/219 |
| 6,157,680 A | * | 12/2000 | Betts et al. | 375/285 |
| 6,181,952 B1 | * | 1/2001 | Murata | 455/552.1 |
| 6,345,088 B1 | * | 2/2002 | Gu et al. | 379/93.35 |
| 6,381,472 B1 | * | 4/2002 | LaMedica et al. | 455/560 |
| 6,483,875 B1 | * | 11/2002 | Hasebe et al. | 375/240.15 |
| 6,591,116 B1 | * | 7/2003 | Laurila et al. | 455/558 |
| 6,594,347 B1 | * | 7/2003 | Calder et al. | 379/88.01 |
| 6,598,788 B1 | * | 7/2003 | Dabrowski | 235/381 |

* cited by examiner

Primary Examiner—Emmanuel Bayard
(74) Attorney, Agent, or Firm—Welsh & Katz, Ltd.

(57) ABSTRACT

A system and method for providing informative communications while a connection is being established between two communications devices, such as computers or facsimile machines. The method includes suppressing audio tones that are sent between the modems and presenting information to a user of the communications device while the connection is being established. The information includes advertisements, music, movie clips, news headlines, sports scores, stock quotes, weather, time of day, calendar reminders, horoscopes, and inspirational sayings. Such information is more informative to the user than the traditional audio tones utilized by the modems and therefore are suppressed in an embodiment of the current invention.

87 Claims, 2 Drawing Sheets

SYSTEM AND METHOD FOR PROVIDING INFORMATIVE COMMUNICATION

TECHNICAL FIELD

This invention relates in general to the field of communications devices and, more particularly, to the communication used by such devices.

BACKGROUND

As is known, communications devices such as computers or facsimile machines require modems to send and receive files of data over the Public Switched Telephone Network (PSTN). To establish a communication link between two computers, the modem of the initiating computer must "handshake" with the modem of the remote computer. Handshaking is the process by which two modems connect and exchange information related to modem capabilities including but not limited to desired data rate, type of error correction, rate of compression, etc.

A first modem initiates a connection and sends information about how it wants to communicate with a second modem. The second modem responds by sending information about how it wants to communicate with the first modem. The two modems send messages back and forth until a common mode of operation (e.g., speed, error correction, and compression) is agreed upon. Also, during this process, parity, checksums, and decompression formulas are checked. If any of the formulas are incorrectly implemented, then the receiving modem will ask that the data be resent. Only when all this information has been exchanged will the handshaking process be complete.

Further, if the telephone line is prone to random signal disturbances (e.g. noise), then the disturbances may disrupt the messages and may corrupt the information being exchanged. In metal analog telephone lines, noise is a major problem that often requires the modems to resend many messages. Even if the line is not prone to signal disturbances, the connection may be dropped many times before a file is ultimately transferred. Further, since many items need to be agreed upon, the whole process may take a very long time. In analog lines, this process may take as long as thirty seconds to complete.

During the "handshaking" process, modems emit a series of audio tones to indicate the progression of the session. For example, a user may hear dialing, ringing, high tones and dips, static, and then silence during the handshake. The series of audio tones indicate the status of the connection. However, the audio tones are difficult to interpret, as they are not translated in a manner that is easily understood to the average user. A user understands that silence normally means that no exchange of information is taking place and a high pitched audio tone means an exchange of information. Beyond these two extremes, the average user can not understand the handshaking process. In addition, more often than not, the user does not care about the meaning of these audio tones and often finds them to be annoying. Further, if this process takes a long time, the average user may become frustrated and irritated at having to wait so long.

Thus, while the existing method of providing informative communication is functional, it can result in delay and user frustration and annoyance. Accordingly, a need exists for a better method of providing informative communication.

SUMMARY

In one embodiment of the present invention, a system and method is provided for providing informative communication while a connection is being established between two communications devices. The method includes suppressing at least some of the audio tones that are sent between the modems to establish the connection and substituting information unrelated to at least some of the audio tones to a user of the communications device while the connection is being established. The information includes advertisements, music, movie clips, news headlines, sports scores, stock quotes, weather, time of day, calendar reminders, horoscopes, messages, inspirational sayings and the like. Such information is more informative and/or less annoying to the user than the traditional audio tones utilized by the modems and therefore the audio tones are suppressed in an embodiment of the current invention. The information may be static or dynamically updated so that a user is presented with new information upon each connection.

In one exemplary embodiment, the system provides for suppressing at least some audio tones in computers and facsimile machines that use modems and provides for static and/or dynamic information to be presented to a user of the computer or facsimile machine.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

Figure 1:
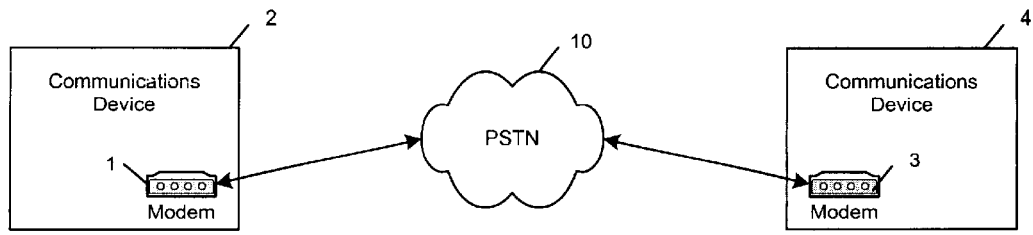
FIG. 1 is a diagram illustrating an example of a communication system utilizing two communications devices.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION

Referring to the drawings, FIG. 1 depicts a general environment in which the illustrated embodiment of the invention operates. In the embodiment of FIG. 1, when communications devices 2, 4 wish to exchange digital information through a Public Switched Telephone Network (PSTN) 10, they may do so through the use of modems 1, 3. Typically, when one communications device 2 desires to communicate with another communications device 4, the devices 2, 4 use modems 1, 3 connected one-to-another through a communications network, for example, a PSTN 10. In the illustrated embodiment of FIG. 1, communications device 2 sends information in digital form to an attached modem 1, which converts the digital information to analog form. The modem 1 then sends the analog information through the PSTN 10 to a second modem 3 that is connected to a second communications device 4. The second modem 3 converts the analog information back into digital information and sends the information in digital form to the attached communications device 4. Further, the communications devices 2, 4 can simultaneously serve as senders and receivers of information. For example, in one embodiment, communications device 2 can simultaneously send information to communications device 4 and receive information from communications device 4.

Figure 2:
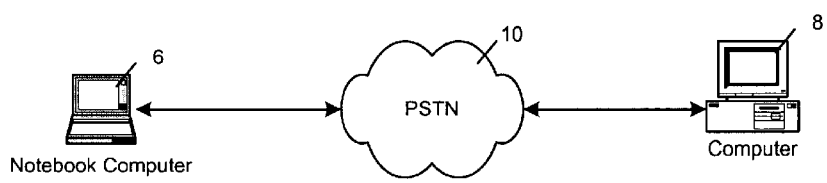
FIG. 2 is a diagram illustrating a specific embodiment of FIG. 1 with two computer devices.
Figure 3:
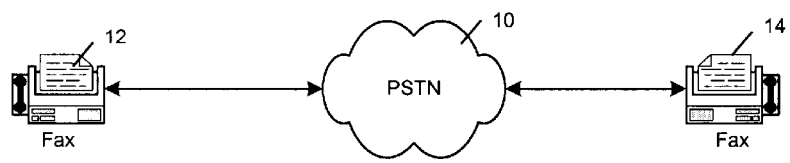
FIG. 3 is a diagram illustrating a specific embodiment of FIG. 1 with two facsimile machines.
Figure 4:
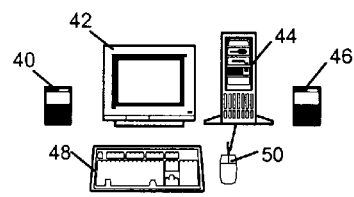
FIG. 4 is a simplified functional diagram illustrating an exemplary embodiment of a modem device of FIG. 1.
Figure 5:
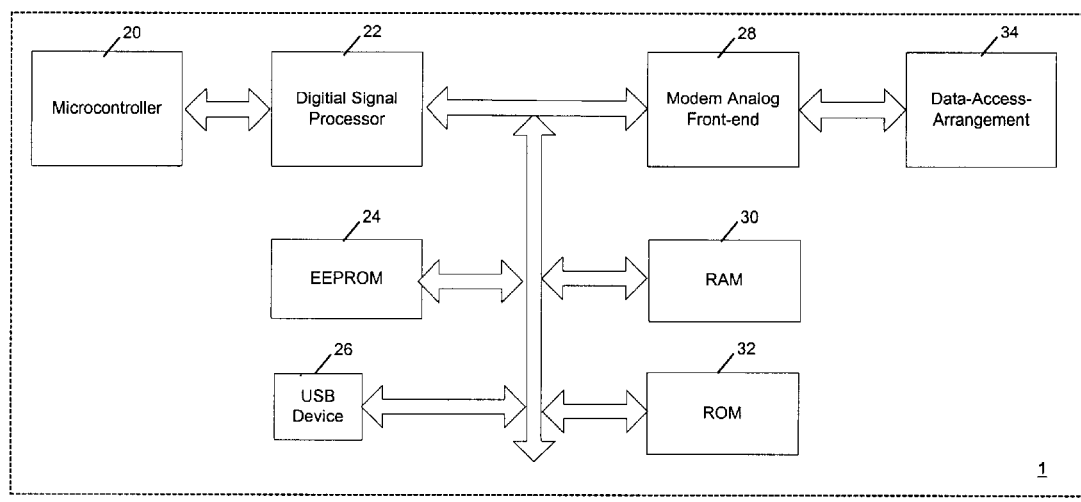
FIG. 5 is a simplified diagram illustrating an exemplary embodiment of a communications device of FIG. 1.

Communications devices 2, 4 may function as intelligent machines which communicate with each other. In an exemplary embodiment, any commercially available computer may be regarded as the type of communications device contemplated herein. Referring now to FIG. 4, an exemplary embodiment of a communications device may take the form of a desktop computer which may include a display 42, keyboard 48, mouse 50, tower CPU 44, and two speakers 40, 46. The display may be any commercially available device suitable for presenting informative communication, including but not limited to a CRT monitor, LCD display, active matrix display and LED display. Other examples of communications devices include, but are not limited to notebook computers, computer servers, computer workstations, facsimile machines, personal digital assistants (PDAs), handheld computers, wireless communication devices and palmtops. For example, FIG. 2 depicts a notebook computer 6 exchanging information with a desktop computer 8 and FIG. 3 depicts two facsimile machines 12, 14 exchanging information.

Communications devices 2, 4 may optionally house the modems 1, 3. In the illustrated embodiment of FIG. 1, modems 1, 3 are internal modems of communications devices 2, 4. An internal modem may reside on an expansion board that plugs into the associated communications device 2, 4. For example, as in FIG. 3, where the communications device is a facsimile machine, the modem is housed in the facsimile machine 12, 14.

Modems 1, 3 may take the form of a processor of the communications device 2, 4 (i.e. a software modem) or where modem functionality is combined with other communications functionality (i.e. a host-based modem). For example, commercially available modem chipsets function as a modem and host processor. Also, an external modem connected to a communications port of the communications device 2, 4 is another example of a suitable modem. Thus, only modems where the communication protocol leaves useable time period, such as during initial handshake, are suitable.

In an exemplary embodiment illustrated in FIG. 4, modem 1 includes a microcontroller 20, a digital signal processor 22, memory 24, 30, 32, modem analog front-end 28, data-access-arrangement 34, and universal serial bus (USB) device 26 to support communications with a computer, such as computer 8. Another exemplary modem architectures may include other bus interface devices in place of the USB device 26 for communication with the processor of the communications device 2, 4. Further, an exemplary modem architecture may include the functionality of the microcontroller 20, the digital signal processor 22, the modem analog front-end 28 and the data-access-arrangement 34 in one integrated circuit.

In one embodiment, a device in the modem or the communications device may perform the modem function of generating audio tones. Further, the sound of the audio tones may be heard by the user of the communications device when the modem sends the audio tones to a speaker 40, 46 associated with the communications device or through an internal speaker associated with the modem.

In an exemplary embodiment, communications device 2 via associated modem 1 initiates a communications session by dialing a telephone number associated with communications device 4 and associated modem 3. As the modems 1, 3 negotiate and go through the handshaking process, the communications device 2 presents useful information to the user from files stored in memory 30, or alternately from some other storage device (not shown). While the useful information is presented to the user, the two modems 1, 3 are simultaneously "silently" negotiating the handshake process described earlier. That is, the users are not aware that the handshake process is taking place since the audio tones necessary to establish the handshake are still sent and received by the modems 1, 3, but at least some are not sent from the modems 1, 3 to speakers (e.g., 40 and 46) of the communications devices 2, 4. In one embodiment, turning the speakers off or switching them for use in delivering useful audio information is performed by microprocessor 20 (e.g., executing an AT command, such as ATM). Once the handshake negotiation is completed and the connection is established, the microcontroller 20 may terminate the presentation of useful information.

In an exemplary embodiment, the modem 1 associated with communications device 2 may "silently" negotiate with modem 3, while modem 3 may emit the audio tones to the speakers associated with communications device 4. Thus, the user of communications device 2 will receive informative communication while the user of communications device 4 will hear the incomprehensible audio tones of the handshaking process.

Further, the useful information may be visual, audio, or audio-visual. For example, visual information may include an advertisement shown on a screen (e.g., monitor 42) or other display device associated with communications device 2 while audio information may include advertising messages played through a sound transducer (e.g., speaker 40 or 46) associated with communications device 2.

Useful information that may be presented to the user may include, but is not limited to, advertisements, music, movie clips, news headlines, sports scores, stock quotes, weather, time of day, calendar reminders, horoscopes, system status, messages including voice or e-mail messages, and inspirational sayings. Further, the information may include verbal messages indicating the progress of the handshake negotiation such as "Negotiating Baud Rate" and "Data Connection Established". Further the information which is presented to the user may vary depending on factors, such as the time of day. For example, if it is morning the information may comprise the message, "Good Morning", and if it is afternoon, the information may comprise the message "Good Afternoon."

In an alternative embodiment, the user may switch between hearing useful information and hearing the audio tones necessary to establish a connection with another modem. Alternating between the two modes may, for example, be accomplished by pressing a softkey on the keyboard 48 of communications device 2 or by clicking on the monitor 42 of communications device 2 with an electronic pen or stylus.

In one embodiment, the useful information is not delivered until dialing and/or ringing tones are generated, while in another embodiment the useful information is delivered immediately upon initiation of the modem call. In one such embodiment, dial tones are presented to the user since users are generally aware that dialing means that the modem is making a call. In such an embodiment, as the modem is dialing, the tones necessary to establish a connection are sent to the speaker (e.g. 40 or 46) so that the user can hear the dial tones. Once the dialing is completed, audio tones representing the ringing of the placed telephone call can also be sent to the speaker (e.g. 40 or 46). Again, the ringing tones are presented to the user since the user is familiar and understands their meaning. Once the receiving modem picks up the call, an exemplary embodiment of the invention will immediately present information to the user and suppress the sound of the negotiation process. As mentioned above, suppressing the sound of the negotiation process may occur by issuing the command ATM to the modem.

In an alternative embodiment, useful information is played to the user upon receipt of a call. As mentioned above, useful information may include, but is not limited to, advertisements, music, movie clips, news headlines, sports scores, stock quotes, weather, time of day, calendar reminders, horoscopes, messages, and inspirational sayings. Further, messages indicating the progress of the handshake may be presented on the receive side. Other information on the receiving side may include messages indicating the identity of the sending modem.

The information may be either static or dynamic. If the information is static, the same message is presented to the user upon each connection attempt. For example, a commercially available modem may emit four distinctive tones identifying itself or play the name "Conexant." If the information is dynamic, then it is updated and changed at automatic intervals. The intervals may include a predetermined time, such as once a week, once a day, or may be every connection or disconnection.

Information may be stored either in the modem 1, 3 or in the communications device 2, 4 connected to the modem 1, 3. Information that can not be changed may be stored in non-volatile memory, such as read-only memory (ROM) (e.g., ROM 32) or programmable read-only memory (PROM) (e.g., EEPROM 24) located either in the modem 1,3 or in the communications device 2,4. The information may be presented to the user through a speaker either in the modem 1, 3 or in the communications device 2, 4. Information that can be changed may be stored in volatile memory, such as random access memory (RAM) in the modem or the communications device connected to the modem. Further, such information may be maintained in files on a hard drive (e.g. on tower 44) of the communications device.

Upon establishing a connection with another modem, the call initiating modem may subsequently receive new information from an outside source. The outside source can be any local or remote source capable of providing the new information such as a local or remote storage device, a local or remote information server, the communications device associated with the other modem, etc. The new information may be stored either in the modem or in the communications device. This new information may be presented to the user in a subsequent attempt to establish a connection with another modem. For example, during a current handshake process, the user may be presented with an advertisement message that was downloaded on a previous connection. Upon completion of the handshake process, a new advertisement message may be downloaded replacing the prior message. In the user's next attempt to establish a connection with a remote data processing apparatus, this new advertisement message would be presented to the user. In one embodiment of the invention, upon completion of the handshake process, the communications device may retrieve new information from an information server and download and store the new information.

Information may also be configurable. In an exemplary embodiment of the present invention, the communications device comprises a software portion that enables the user to configure the information according to the user's preferences. The software portion may offer the user a choice of choosing one of several stored audio options. For example, an exemplary embodiment may offer the user the ability to choose between different types of information. For example, if the user wishes the listen to music, the user is given music when the modems are connecting. If the user wishes to listen to current headlines, current headlines are played when the modems are connecting. Further, such configurability can be implemented in an embodiment of the invention regardless of whether the information is static or dynamic. Thus, user's preferences are information that the user would like to receive, including music, hobbies, sports, occupation, news, science, and business. The information can also be automatically configured based upon a profile of the user generated by, for example, monitoring the user's use of the communications device (e.g., purchase of music, etc. on the internet).

In an exemplary embodiment that implements dynamic information the modems may also comprise a server that provides new information to the user upon request. This server may be connected to the communications device independent of the modem. For example, the communications device may be connected to a local area network containing the server or the communications device may have a wireless connection to the server. Thus when the modem is initiating the handshake process, a software portion may request that the server provide new information to the system. In one embodiment, the server may stream timely information to the communications device while the modem is engaged in the handshake process. In an alternative embodiment, the server may be only accessible to the communications device upon connection with another communications device. As discussed earlier, in this embodiment, once a connection is established, the software portion will request updated information from the server through the connection. The modem will receive the information and store it either in the modem itself or in the communications device. The system will subsequently present the new information to the user during future modem connection attempts until it is once again updated.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

I claim:

1. A method for providing informative communication when a connection is being established between communication devices with modems comprising:

suppressing at least some audio tones that would otherwise be heard by a user of at least one of the communication devices and which audio tones are digital handshaking that is sent between the modems to establish the connection and where the suppressed audio tones are not echos; and substituting information unrelated to at least one suppressed audio tone to the user of at least one communication device while the connection is being established.

2. The method for providing informative communication as in claim 1 wherein the information includes advertisements, music, movie clips, news headlines, sports scores, stock quotes, weather, time of day, calendar reminders, horoscopes, messages, and inspirational sayings.

3. The method for providing informative communication as in claim 1 wherein the information is conveyed in audio, visual, or audio-visual format to the user.

4. The method for providing informative communication as in claim 1 wherein the information comprises verbal messages describing the connection process.

5. The method for providing informative communication as in claim 1 wherein the information comprises visual information shown on a display associated with the at least one communications device.

6. The method for providing informative communication as in claim 1 wherein the information is configurable according to the user's preferences.

7. The method for providing informative communication as in claim 6 wherein preferences are types of information that the user would like to receive, including music, hobbies, sports, occupation, news, science, and business.

8. The method for providing informative communication as in claim 1 wherein the step of suppressing further comprises removing a connection between the modems and at least one speaker associated with the at least one communications device.

9. The method for providing informative communication as in claim 1 wherein the step of substituting further comprises sending the information to at least one speaker associated with the at least one communications device.

10. The method for providing informative communication as in claim 1 wherein the step of substituting further comprises presenting the information on a display device associated with the at least one communications device.

11. The method for providing informative communications as in claim 10 wherein the display device is chosen from the group consisting of CRT monitor, LCD display, active matrix display and LED display.

12. The method for providing informative communication as in claim 1 further comprising providing the user with ability to switch between receiving the suppressed audio tones and receiving presented information.

13. The method for providing informative communication as in claim 12 wherein the step of receiving the suppressed audio tones further comprises sending to at least one speaker associated with the at least one communications device the audio tones sent between the modems.

14. The method for providing informative communication as in claim 1 wherein the information is static.

15. The method for providing informative communication as in claim 1 wherein the information is dynamic.

16. The method for providing informative communication as in claim 15 further comprising:
requesting new information from an outside information server; receiving the new information; and storing the new information in the at least one communications device until it is presented to the user when a subsequent connection is established.

17. The system for providing informative communication as in claim 15 further comprising:
means for requesting new information from an outside information server; means for receiving the new information; and
means for storing the new information in at least one communications device until it is presented to the user when a subsequent connection is established.

18. A method for providing informative communications to a user of a first communications device and first modem when the first communications device is establishing a connection with a second communications device and second modem comprising:
suppressing at least some audio tones that would otherwise be heard by a user of at least one of the communication devices and which audio tones are digital information that is sent between the first and second modems to establish the connection and where the suppressed audio tones are not echoes; and
substituting information unrelated to at least one suppressed audio tone to the user of the first communication device and first modem while the connection is being established.

19. A system for providing informative communications when a connection is begin established between communications devices comprising memory, a display, a speaker and a modem comprising:
means for suppressing audio tones that would otherwise be heard by a user of at least one of the communication devices and which audio tones are digital information that is sent between the modems to establish the connection and where said suppressed audio tones are not echoes; and
means for substituting information unrelated to at least one suppressed audio tone to a user of at least one communication device while the connection is being established.

20. The system for providing informative communication as in claim 19 wherein the information includes advertisements, music, movie clips, news headlines, sports scores, stock quotes, weather, time of day, calendar reminders, horoscopes, messages, and inspirational sayings.

21. The system for providing informative communication as in claim 19 wherein the information is conveyed in audio, visual, or audio-visual format to the user.

22. The system for providing informative communication as in claim 19 wherein the information comprises verbal messages describing the connection process.

23. The system for providing informative communication as in claim 19 wherein the information comprises visual messages shown on a display associated with the at least one communications device.

24. The system for providing informative communication as in claim 19 wherein the information is configurable according to the user's preferences.

25. The system for providing informative communication as in claim 24 wherein preferences are types of information that the user would like to receive, including music, hobbies, sports, occupation, news, science, and business.

26. The system for providing informative communication as in claim 19 wherein the means for suppressing further comprises means for removing a connection between the modems and at least one speaker associated with the at least one communications device.

27. The system for substituting informative communication as in claim 19 wherein the means for presenting further comprises means for sending the information to at least one speaker associated with the at least one communications device.

28. The system for substituting informative communication as in claim 19 wherein the means for presenting further comprises means for sending the information to a display associated with the at least one communications device.

29. The system for providing informative communication as in claim 28 wherein the display is chosen from the group consisting of CRT monitor, LCD display, active matrix display and LED display.

30. The system for providing informative communication as in claim 19 further comprising means for providing the user with ability to switch between receiving the suppressed audio tones and receiving presented information.

31. The system for providing informative communication as in claim 30 wherein means for receiving the suppressed audio tones further comprises sending to at least one speaker associated with the at least one communications device the audio tones sent between the modems.

32. The system for providing informative communication as in claim 19 wherein the information is static.

33. The system for providing informative communication as in claim 19 wherein the information is dynamic.

34. A system for providing informative communications to a user of a first communications device and first modem when the first communication device is establishing a connection with a second communication device and second modem comprising:

means for suppressing at least some audio tones that would otherwise be heard by a user of at least one of the communication devices and which audio tones are digital information that is sent between the first and second modems to establish the connection and where the suppressed audio tones are not echoes; and means for substituting information unrelated to at least one suppressed audio tone to the user of the first communication device and first modem while the connection is being established.

35. A system for providing informative communications when a connection is being established between communication devices comprising memory, a display, a speaker and a modem comprising:

a tone generator to send audio tones between the modems which upon demand also sends said audio tones to the user through the speaker, said audio tones being digital information that is sent between communication devices to establish the connection, said audio tones being incomprehensible to the user and where said audio tones are not echoes; and memory for storing information; and a communicator which presents the stored information to the user instead of the sent audio tones while the connection is being established and only while the connection is being established.

36. The system for providing informative communication as in claim 35 wherein the information includes advertisements, music, movie clips, news headlines, sports scores, stock quotes, weather, time of day, calendar reminders, horoscopes, messages, and inspirational sayings.

37. The system for providing informative communication as in claim 35 wherein the information is conveyed in audio, visual, or audio-visual format to the user.

38. The system for providing informative communication as in claim 35 wherein the information comprises verbal messages describing the connection process.

39. The system for providing informative communication as in claim 35 wherein the information comprises visual information shown on the display associated with the at least one communications device.

40. The system for providing informative communication as in claim 35 wherein the information is configurable according to the user's preferences.

41. The system for providing informative communication as in claim 40 wherein preferences are types of information that the user would like to receive, including music, hobbies, sports, occupation, news, science, and business.

42. The system for providing informative communication as in claim 35 wherein the stored information is shown on the display of the associated communications device.

43. The system for providing informative communication as in claim 42 wherein the display is chosen from the group consisting of CRT monitor, LCD display, active matrix display, and LED display.

44. The system for providing informative communication as in claim 35 further comprising a switch to change between receiving audio tones from the tone generator and receiving presented information.

45. The system for providing informative communication as in claim 44 wherein the audio tones and the information are sent to the speaker.

46. The system for providing informative communication as in claim 35 wherein the information is static.

47. The system for providing informative communication as in claim 35 wherein the information is dynamic.

48. The system for providing informative communication as in claim 47 further comprising:

a requestor of information from an information server;

a receiver of the requested information; and memory for storing the requested information in the at least one communications device.

49. The system for providing informative communication as in claim 48 wherein the requester and receiver are the modem of the at least one communications device.

50. The system for providing informative communication as in claim 48 wherein the requester and receiver are the central processor of the at least one communications device.

51. A method for providing informative communication when a connection is being established between communication devices comprising:

suppressing at least some audio tones associated with establishing the connection that would otherwise be heard by a user of at least one of the communication devices, said audio tones being digital information that is exchanged between the communication devices to establish the connection and where said suppressed audio tones are not echoes; and substituting information unrelated to at least one suppressed audio tone to a user of at least one communications device while the connection is being established.

52. The method for providing informative communication as in claim 51 wherein the information includes advertisements, music, movie clips, news headlines, sports scores, stock quotes, weather, time of day, calendar reminders, horoscopes, messages, and inspirational sayings.

53. The method for providing informative communication as in claim 51 where the substituted information includes information transmitted during a prior communication.

54. The method for providing informative communication as in claim 51 where the communications device is chosen from the group consisting of desktop computer, notebook computer, computer server, computer workstation, facsimile machine, personal digital assistant (FDA), hand-held computer, wireless communications device and palmtop.

55. The method for providing informative communication as in claim 51 wherein the information is conveyed in audio, visual, or audio-visual format to the user.

56. The method for providing informative communication as in claim 51 wherein the information comprises visual information shown on a display associated with the at least one communications device.

57. The method for providing informative communication as in claim 51 wherein the information is configurable according to the user's preferences.

58. The method for providing informative communication as in claim 57 wherein preferences are types of information that the user would like to receive, including music, hobbies, sports, occupation, news, science, and business.

59. The method for providing informative communication as in claim 51 wherein the step of suppressing further comprises removing a connection between the at least one communications device and at least one speaker associated with the at least one communications device.

60. The method for providing informative communication as in claim 51 wherein the step of substituting further comprises sending the information to at least one speaker associated with the at least one communications device.

61. The method for providing informative communication as in claim 51 wherein the step of substituting further comprises presenting the information on a display device associated with the at least one communications device.

62. The method for providing informative communications as in claim 61 wherein the display device is chosen from the group consisting of CRT monitor, LCD display, active matrix display and LED display.

63. The method for providing informative communication as in claim 51 further comprising providing the user with ability to switch between receiving the suppressed audio tones and receiving presented information.

64. The method for providing informative communication as in claim 63 wherein the step of receiving the suppressed audio tones further comprises sending to at least one speaker associated with the at least one communications device the audio tones sent between the communications devices.

65. The method for providing informative communication as in claim 51 wherein the information is static.

66. The method for providing informative communication as in claim 51 wherein the information is dynamic.

67. The method for providing informative communication as in claim 66 further comprising:
    requesting new information from an outside information server; receiving the new information; and
    storing the new information in at least one communications device until it is presented to the user when a subsequent connection is established.

68. A method for providing informative communication when a connection is being established between communication devices comprising:
    suppressing at least some audio tones associated with establishing the connection that would otherwise be heard by a user of at least one of the communication devices, said audio tones being digital information that is exchanged between the communication devices and where said at least some suppressed audio tones are not echoes; and
    substituting information unrelated to at least one suppressed audio tone to a user of at least one communications device while the connection is being established where the substituted information is information transmitted during a prior communication with the at least one communication device.

69. The method for providing informative communication as in claim 68 wherein the information includes advertisements, music, movie clips, news headlines, sports scores, stock quotes, weather, time of day, calendar reminders, horoscopes, messages, and inspirational sayings.

70. The method for providing informative communication as in claim 68 where the communications device is chosen from the group consisting of desktop computer, notebook computer, computer server, computer workstation, facsimile machine, personal digital assistant (PDA), hand-held computer, wireless communications device and palmtop.

71. The method for providing informative communication as in claim 68 wherein the information is configurable according to the user's preferences.

72. The method for providing informative communication as in claim 71 wherein preferences are types of information that the user would like to receive, including music, hobbies, sports, occupation, news, science, and business.

73. A method for providing informative communication to a user of a first communications device when the first communication device is receiving a call from a second communications device comprising:
    suppressing at least some audio tones that are sent between the first and second communication devices to establish a connection for the call during set up of the call and only during set up of the call and where the suppressed audible tones is not echoes;
    retrieving stored audio, visual or audio-visual information of the first communications device to provide retrieved information;
    communicating the retrieved audio, visual or audio-visual information to the user of the first communications device during set up of the call and only during set up of the call; and
    storing new information to replace the stored information in the first communications device with new information received from a source of communicated information.

74. The method of claim 73 where the communications device is chosen from the group consisting of desktop computer, notebook computer, computer server, computer workstation, facsimile machine, personal digital assistant (PDA), hand-held computer, wireless communications device and palmtop.

75. The method of claim 74 where the wireless communications device is chosen from the group consisting of cellular telephone, portable telephone, mobile phone, hand-held telephone, and car phone.

76. The method of claim 73 wherein the source of communicated information is a communications device which transmits new information during a previous communication.

77. The method of claim 73 wherein the source of communicated information is a wireless communication.

78. A system for providing informative communication to a user of a first communications device when the first communications device is receiving a call from a second communications device comprising:
    means for suppressing at least some audio tones that are sent between the first and second communication devices to establish a connection for the call during set up of the call and only during set up of the call and where the suppressed audible tones is not echoes;
    means for retrieving stored audio, visual or audio-visual information of the first communications device to provide retrieved information;
    means for communicating the retrieved audio, visual or audio-visual information to the user of the first communications device in place of the at least some suppressed audio tones; and
    means for storing new information to replace the stored information in the first communications device with new information received from a source of communicated information.

79. The system of claim 78 where the communications device is chosen from the group consisting of desktop computer, notebook computer, computer server, computer workstation, facsimile machine, personal digital assistant (FDA), hand-held computer, wireless communications device and palmtop.

80. The system of claim 79 where the wireless communications device is chosen from the group consisting of cellular telephone, portable telephone, mobile phone, hand-held telephone, and car phone.

81. The system of claim 78 wherein the source of communicated information is a communications device which transmits new information during a previous communication.

82. The system of claim 78 wherein the source of communicated information is a wireless communication.

83. A system for providing informative communication when a connection is being established between communications devices comprising:

a microprocessor that suppresses at least some audio tones of a handshaking process between the communication devices when the connection is being established where the at least some suppressed audio tones are not echoes;

an information processor which retrieves stored audio, visual or audio-visual information from a first communications device and which replaces the stored information with new information; and an information output system which communicates the stored audio, visual or audio-visual information to a user of the first communications device instead of the at least some audio tones exchanged through the connection while the connection is being established;

wherein the new information is replaced by the stored information after the stored information is communicated to the user of the first communications device.

84. The system of claim 83 where the communications device is chosen from the group consisting of desktop computer, notebook computer, computer server, computer workstation, facsimile machine, personal digital assistant (FDA), hand-held computer, wireless communications device and palmtop.

85. The system of claim 84 where the wireless communications device is chosen from the group consisting of cellular telephone, portable telephone, mobile phone, hand-held telephone, and car phone.

86. The system of claim 83 wherein the stored information is transmitted during a previous communication.

87. The system of claim 83 wherein the stored information is transmitted by a wireless communication.

* * * * *